ID.

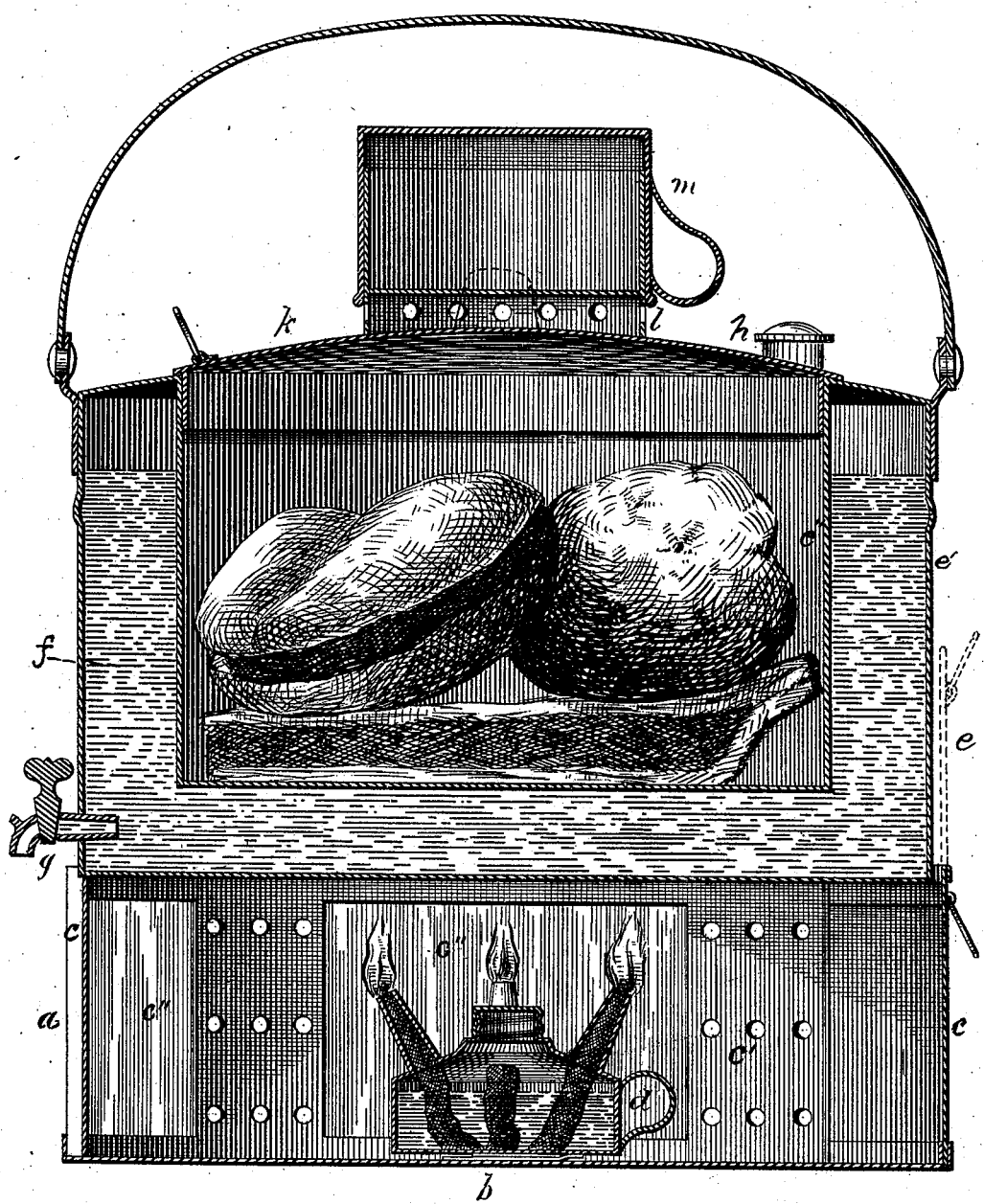

UNITED STATES PATENT OFFICE.

SOLOMON WINKLER, OF CANAL DOVER, OHIO.

DINNER-BUCKET.

SPECIFICATION forming part of Letters Patent No. 261,506, dated July 18, 1882.

Application filed March 16, 1882. (No model.)

*To all whom it may concern:*

Be it known that I, SOLOMON WINKLER, a citizen of the United States, residing at Canal Dover, in the county of Tuscarawas and State of Ohio, have invented a new and useful Dinner-Bucket, of which the following is a specification.

This invention relates to improvements in dinner-buckets.

It consists in a vessel having the peculiar construction and features hereinafter set forth.

In the accompanying drawing the figure represents a section of the device.

The letter $a$ designates the base or lamp-chamber. This has a bottom, $b$, and circular wall $c$, the latter being provided with air-holes $c'$, and openings $c''$, filled with glass or mica. Seated within this chamber is a lamp, $d$, which is used both for heat and light. Resting within the top of and separately attached to this chamber $a$ is the food-receptacle $e$. This consists of an outer shell, $e'$, and an inner concentric one, $e''$, the latter being connected to the former at the top and depending within it, so that there is a free space all around between the bottoms and walls of the two shells. Leading from this intermediate space, $f$, is a cock or faucet, $g$, and leading into it a filling-tube, $h$. The shell $e''$ is open at the top, and has a cover, $k$, fitting it snugly. This cover has rising from it a ring, $l$, which is perforated and is adapted to receive a cup, $m$.

The dinner-bucket being separable from the lamp-chamber, the latter can at any time be removed, leaving a food-receptacle which can be used independently. The lamp-chamber can also be used by a mechanic for warming or heating anything else. The holes in the ring $l$ allow the escape of warm air, keeping butter or anything in the ring from getting heated.

This furnishes a useful device suitable to mechanics. The heat from the lamp keeps the liquid hot, and the heat is transmitted to the food within the shell or receptacle $e''$, warming its contents. The shells being concentric, the heat surrounds the inner one, warming the food all through.

Having described my invention, what I claim is—

A lunch-bucket provided with the ring $l$, having perforations, as shown.

SOLOMON WINKLER.

Witnesses:
FRED MILLER,
JOSEPH ARNOLD.